May 23, 1967 F. KRONES 3,321,586

MEANS FOR INCREASING THE RECORDING DYNAMIC WHEN USING DEMAGNETIZING DEVICES FOR MAGNETIC STORAGE MEANS

Filed April 18, 1960

3 Sheets-Sheet 1

INVENTOR.
FRIEDRICH KRONES

INVENTOR.
FRIEDRICH KRONES

INVENTOR.
FRIEDRICH KRONES

United States Patent Office 3,321,586

Patented May 23, 1967

3,321,586

MEANS FOR INCREASING THE RECORDING DYNAMIC WHEN USING DEMAGNETIZING DEVICES FOR MAGNETIC STORAGE MEANS

Friedrich Krones, Leverkusen, Germany, assignor to Agfa Aktiengesellschaft, Leverkusen, Germany, a corporation of Germany Filed Apr. 18, 1960, Ser. No. 23,101
Claims priority, application Germany, Apr. 18, 1959, A 31,865
9 Claims. (Cl. 179—100.2)

Figure 1:
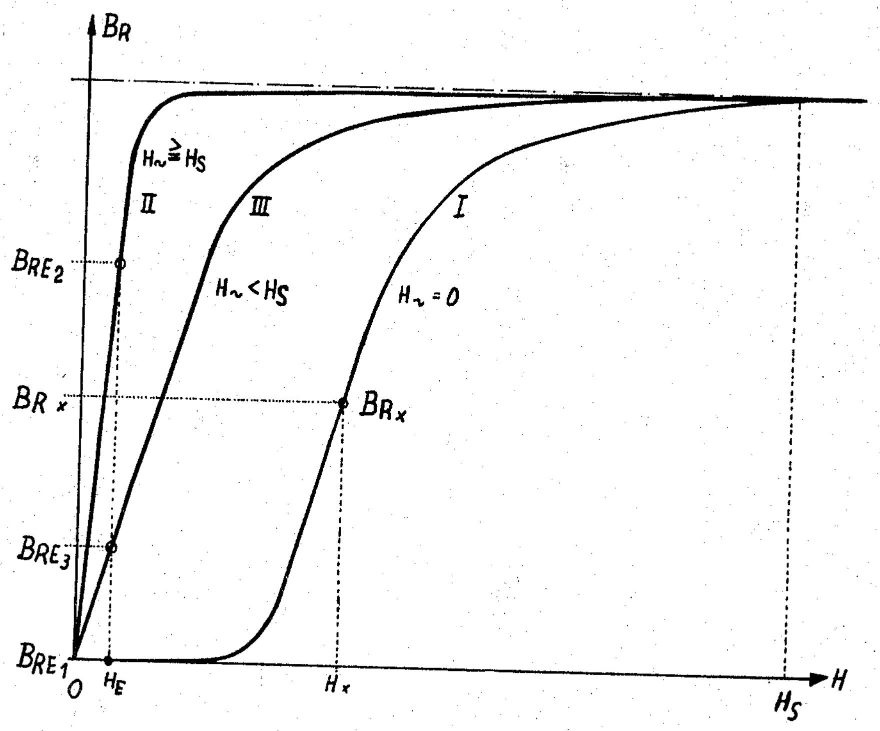

The present invention relates to demagnetizing devices for magnetic record carriers and more especially to demagnetizing devices containing means for screening the erasing head against the action of undesired magnetic fields of low field-intensity particularly the earth's field.

It has long been known to the users of instruments employing magnetic tape that an unused, remanence-free magnetic tape, (i.e. a virgin magnetic tape) is absolutely free from any disturbing voltage in reproduction, whereas the same tape, after having once received a magnetic record which is thereafter erased, comprises a noise component which it has not been possible to eliminate, even by the most careful demagnetization using special erasing devices.

On conventional magnetic sound instruments, the erasing is effected by means of a high-frequency alternating current, which flows through the wire winding of an erasing head and produces a magnetic alternating flux in the annular core thereof. This annular core is either made of high permeability sheet metal lamellae or of ferrite and has an air gap. The alternating flux produced in the annular core is conducted through the latter to the gap and leaves the gap as a stray field. This stray field, which quickly falls to zero at some distance from the gap, travels through the magnetic tape to be demagnetized. The alternating field must thus magnetize the magnetic tape to saturation point in order to erase the recording and thereafter fall to zero on leaving the gap, so that all individual magnetic elementary zones assume a magnetization which corresponds to their energy minimum. The elementary zones of a magnetizable material in the unused, remanence-free, virgin condition are found in this energy minimum. In its macroscopic action in an outward direction, this corresponds to a magnetically neutral, i.e. non-magnetic condition, because the vectorial sum of the magnetic effects of the individual elementary regions is zero because of their statistical distribution in relation to the three space components. In the reproduction of sound from tapes which have been erased in this manner, it has been found that a noise component can be detected owing to the exceptionally sensitive reproduction devices. This does not disappear, even when all metal parts which contact the tape, including the magnetic heads, have been carefully demagnetized with the prior means and the curvilinear form of the erasing current has been made symmetrical or balanced satisfactorily.

As a very sensitive means for showing whether the magnetic sound instrument produces a remanence-free erasure of the tape, the balancing tape proposed in copending United States patent application Ser. No. 13,478 and now U.S. Patent No. 3,255,316 has proved effective. Due to the interruptions in the magnetic layer of this tape, a magnetic unidirectional flux of the tape which per se is inaudible, because of the law of induction, is converted by the movement of the tape into an alternating flux. This alternating flux induces in the sensitive reproduction head an alternating voltage which can be amplified as desired and thus can be very accurately measured, while the recorded insignificant unidirectional flux is only made apparent without this auxiliary means by a noise compartment of second order of smallness.

It is true that the recording can also be erased with a very powerful demagnetizing choke device fed with alternating current, but it is not possible to eliminate a residual slight noise component of the tape. If a balancing tape is erased with this device, it shows a relatively strong steady magnetization, which explains the residual noise component of an ordinary magnetic tape erased in the same manner. In order to exclude any possible lack of symmetry or unbalance of the alternating mains current which may exist and which would be responsible for the unidirectional field remanence of the tape, an attempt has been to demagnetize the balancing tape by means of a special erasing device. With this device, a large condenser is charged with a direct current voltage and then discharged through an air gap, in the internal space of which is arranged the tape to be demagnetized. After having been charged, the condenser is connected to the demagnetizing coil and thereby an oscillatory circuit is formed. The electric charging of the condenser produces in the air-core coil a high-frequency alternating field which is free from harmonics, and thus is absolutely symmetrical or balanced, and aperiodically fades to zero owing to attenuation of the oscillatory circuit. Even under these perfect erasure conditions, the balanced tape showed a unidirectional remanence even after effecting the erasion.

In papers concerned with this phenomenon, references have been made to the fact that the cause must concern a question of unexplained intracrystalline processes. A complete demagnetization of ferromagnetic materials is consequently only to be possible if the element, having once been magnetized, is heated to the Curie temperature. As a result thereof, all separate magnetic areas assume a position which corresponds to their energy minimum, so that the completely remanence-free state is again achieved. Such a measure is however out of the question with the magnetic iron oxides used in the magnetic storage means technique, because in this way the gamma modification of the iron oxide is transformed into the irreversible and unmagnetizable alpha modification, quite apart from the fact that the carrier of the magnetic tape would burn at these high temperatures.

It could be established that the earth's magnetic field is responsible for the always present direct field magnetization of an erased tape. Due to the presence of the vectorial earth magnetic field, this erasing process becomes a perfect magnetization process for the earth's field, the weak steady field leading to an amplified remanence of the tape, which is higher by several orders of magnitude than without the effect of alternating field. In order to explain this amplified effect, reference is made to FIGURE 1. In this diagram, the remanence of the tape $B_R$ caused by the field intensity is plotted over the steady or undirectional field intensity H. The remanence curve I obtained in this way corresponds to the magnetization process in which only the steady field intensity acts on the tape ($H\sim=0$). Each field intensity value $H_x$ has a remanence $B_{Rx}$. Considered as a perfect magnetization is the magnetizing process in which the steady field intensity has superimposed thereon an alternating field reaching to the saturation $H_S$ and this field continuously fades to zero, the steady field intensity being held constant until the alternating field disappears. The remanence curve II ($H\sim\geqq H_S$) obtained in this way starts very steeply and extends rectilinearly from the point of origin and reaches the saturation of the material at very much smaller field intensity. These conditions exist when a ferromagnetic material is exposed to an erasing alternating field, the steady earth field additionally also participating. The field intensity $H_E$ of the earth's field produces with the remanence curve II a remanence value $B_{RE2}$, which is higher by several powers of 10 than the practically disappearing remanence $B_{RE1}$, such as that obtained when the earth's field acts without any idealizing alternating field. In the latter case, the magnetization process takes place in the practically reversible starting region in the vicinity of the point of origin.

This process applied with practically all erasing devices in use at the present time, for example with the erasing head of magnetic sound instruments or special demagnetizing devices for demagnetizing complete spools of magnetic tape. To a somewhat lesser degree, this process also applies as regards the recording head. Since the high-frequency premagnetization field generally does not reach the saturation range when the premagnetization is effected with high-frequency alternating current, there is obtained a somewhat less steep remanence curve corresponding to III in FIG. 1. The remanence value $B_{RE3}$ corresponding to the earth field $H_E$ is higher than $B_{RE1}$ but lower than $B_{RE2}$.

It has now been found that a complete demagnetization i.e. a magnetically complete remanence-free condition of the tape corresponding to a virgin tape and thus absolute freedom from noise in the tape is obtained if also in the erasing process with high-frequency premagnetization, the action of the earth's magnetic field is excluded in such a way that the erasing head or special erasing devices are screened from the effect of undesired magnetic fields of low field intensity, more especially the earth's magnetic field. It is of particular importance that this screening is arranged in the vicinity of the gap field as regards the magnetic head, in order to keep the steady earth field away from the stray field zone of the gap. This is because the magnetizing process of the tape occurs in this gap. It is most desirable to provide the erasing head with the same mumetal screening, including a cover plate, such as is quite usual with the reproducing head.

These discoveries form the basis of the present invention and the application thereof is completely novel and surprising. This is apparent as such features are lacking in all known instruments using magnetic tape. Only the recording and the reproducing heads are protected by a mumetal screening. As regards the erasing head, the screening of the annular head and its winding are lacking. All instruments consequently produce a noise component which hitherto had to be accepted as an apparently unavoidable evil. The extent of the action of the earth's field can be very clearly demonstrated with the balancing tape by the following experiment:

Expensive and high-quality studio instruments have a potentiometer for balancing the curve form of the high-frequency alternating currents. By means of this potentiometer and the balancing tape, the tape magnetization resulting can be reduced to a minimum because of a component of the steady earth field. If the studio instrument is then turned through 90° relative to its original position, the compensation for the now altered component of the earth's field is no longer effective. A loud tone, produced by the chopped steady remanence of the balanced tape, becomes audible. This proves that the screening cap of the erasing head in accordance with the invention is of decisive importance. In order always to obtain the same quality of record for a compensation made once and for all, the magnetic sound instruments would have to be so set up each time that they always assume the same position in relation to the inclination and declination of the earth's field, i.e. that they are aligned in a horizontal and vertical direction by means of a compass. The special erasing devices for erasing entire coils of tape must have a screening means which is arranged at a sufficiently large distance from the erasing alternating field that the strong stray field of such devices cannot saturate the screening means, because otherwise the screening effect thereof would be greatly impaired or cancelled out.

In order to facilitate threading the tape-like magnetic storage means, the erasing head is provided with a hingeable screening cover which, in the closed position, has a sufficient screening effect with respect to disturbing magnetic fields from the zone of the gap stray field in which the erasing takes place without interfering with the movement of the tape.

As regards erasing devices of a general type with which complete reels of magnetic tape can be erased all at once, screening means are used which enclose the entire space filled by the demagnetizing alternating field, provision being made for the screening means to be at a sufficiently large distance from the field space so that the screening action is avoided. The screening action is due to a saturation of the screening material and can lead to a deterioration in the screening effect.

Figure 2:
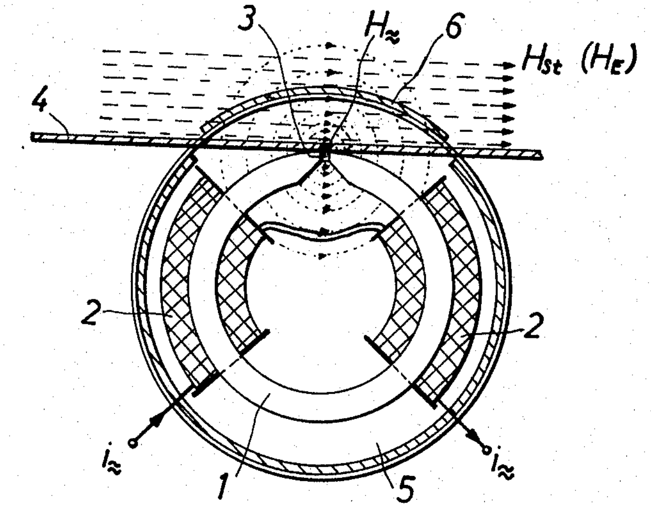

FIG. 2 shows a screening means of mumetal for the erasing head; reference numeral 1 denotes an annular core of soft iron (mumetal or ferrite), 2 a wire winding, 3 a gap, 4 a magnetic tape, 5 screening with a hingeable cover plate 6, $H\approx$ high frequency erasing-alternating field intensity, $H_{st}$ disturbing field intensity, $H_E$ earth's magnetic field intensity.

Figure 3:
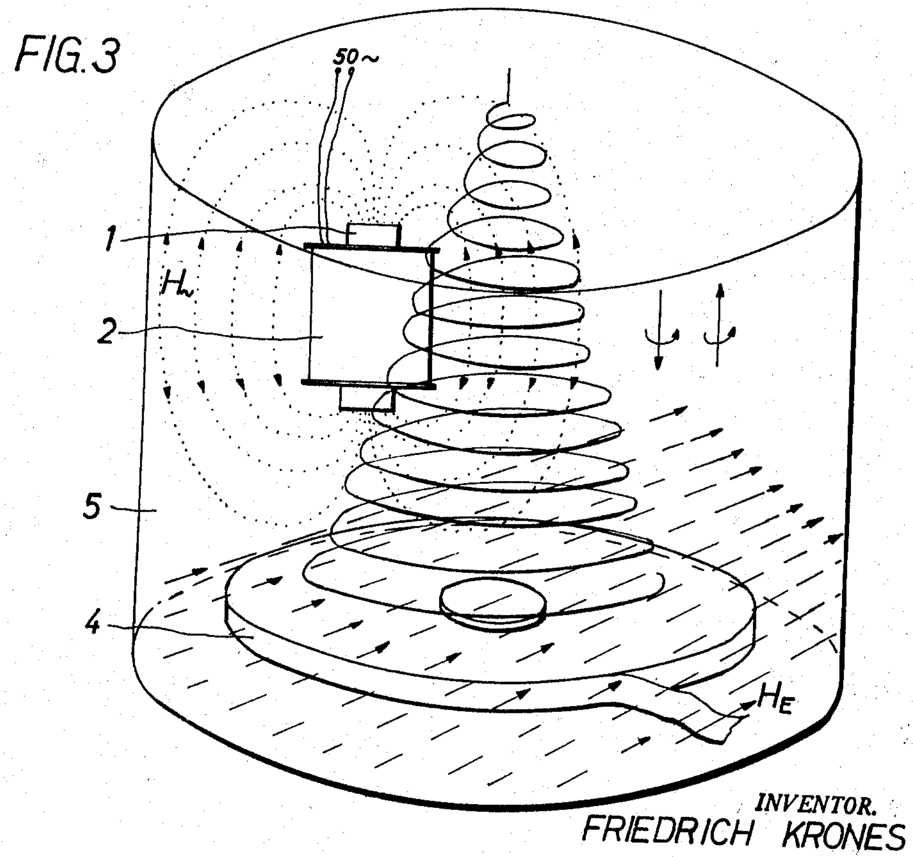
Figures 4, 5:
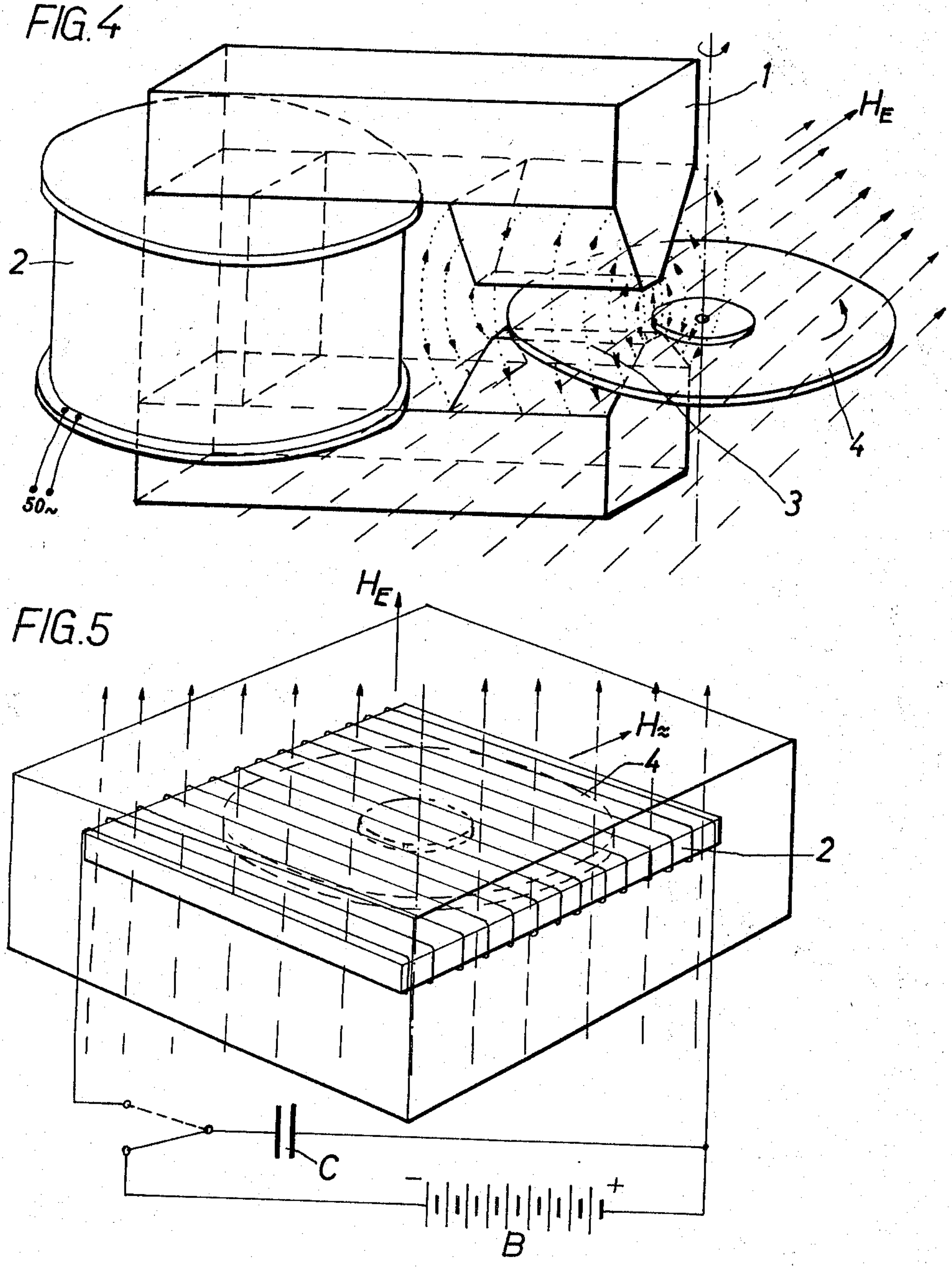

FIGURES 3 and 4 show very strong demagnetizing choke devices which are charged with alternating current. By using devices of this type it is possible to erase any recording, however, a slight noise component is left which is caused by the influence of the earth's field. The detrimental influence of the earth's field occurring with such erasing devices can be eliminated by arranging the devices in a box of ferromagnetic material. These boxes shall enclose the erasing device from all sides.

In FIG. 3, reference numeral 1 denotes an annular core of soft iron (mumetal or ferrite), 2 a wire winding, 4 a reel of magnetic tape, 5 a screening box, $H_E$ earth's magnetic field intensity, $H\approx$ high frequency erasing alternating field intensity.

In FIG. 4, reference numeral 1 denotes an annular core of soft iron, 2 a wire winding, 3 a gap, 4 a reel of magnetic tape, $H_E$ earth's magnetic field intensity.

The noise component remaining with all erasing processes, which is caused by the influence of the earth's field, cannot be removed by using special erasing devices such for example as those shown in FIG. 5. With this device, a large condenser is charged with a direct voltage and then discharged through an air core-coil 2, in the internal space of which there is arranged the tape to be demagnetized. After having been charged, the condenser is connected to the demagnetizing coil and thereby an oscillatory circuit is formed. The electric charging of the condenser produces in the air-core coil a high-frequency alternating field ($H\sim$) which is free from harmonics, and thus is absolutely symmetrical or balanced, and aperiodically fades to zero owing to attenuation of the oscillatory circuit. Even when using an erasing device of the aforesaid kind completely noiseless tapes are obtained only if the influence of the earth's field is eliminated by arranging the device in a box of ferromagnetic material, which encloses the demagnetizing device from all sides 5.

What is claimed is:

1. In a demagnetizing device for erasing signals recorded on magnetic record carriers having a ring shaped erasing head comprising an annular core of magnetic material having a coil mounted therein and having a pair of spaced confronting pole portions forming the erasing gap and relative to which said magnetic record carriers are adapted to be positioned for exposure to the demagnetizing field produced by said ring shaped erasing head, the improvement consisting of a shield element of ferromagnetic material enclosing said magnetic record carrier, the erasing head and the gap zone of the said erasing head for shielding said head against the unidirectional field of the earth, the shield element being sufficiently distant from the alternating demagnetizing field of the erasing head, to avoid magnetic saturation of the shield element.

2. In a demagnetizing device according to claim 1, wherein said shielding means of ferromagnetic material surrounds said erasing head having hingeable cover which does not impede the movement of the tape.

3. A demagnetizing device for erasing signals recorded on magnetic record carriers with which complete reels of magnetic tape are erased all at once having a demagnetizing choke device comprising a coil with a core of magnetic material, the improvement which comprises a shield element of ferromagnetic material surrounding said demagnetizing choke device and said reel of magnetic tape and the entire space filled by the demagnetizing alternating field, provision being made for the shield element to be at a sufficiently large spacing from the field space for screening said device against the action of undesired magnetic fields as produced by the magnetism of the earth.

4. A demagnetizing device for erasing signals recorded on magnetic record carriers with which complete reels of magnetic tape are erased all at once comprising a condenser charged with a direct voltage and an air-core-coil through which the condenser is discharged, in the internal space of said air-core-coil is arranged the reel of magnetic tape to be demagnetized, the improvement which comprises a shield element of ferromagnetic material surrounding said demagnetizing device and said reel of magnetic tape for screening said device against the action of undesired magnetic fields as produced by the magnetism of the earth, provision being made for the shield element to be at a sufficiently large spacing from the field space for screening said device against the action of undesired magnetic fields.

5. A demagnetizing device for erasing signals recorded on magnetic record carriers with which complete reels of magnetic tape are erased all at once comprising a horseshoe-shaped core of ferromagnetic material having a coil of electro-conductive material and having a pair of spaced confronting pole portions forming the erasing gap through which the reel of magnetic tape is turned around its axis of revolution and exposed by that to the demagnetizing field produced by said demagnetizing device, the improvement which comprises a shield element of ferromagnetic material surrounding said demagnetizing device and said reel of magnetic tape for screening said device against the action of undesired magnetic fields as produced by the magnetism of the earth, provision being made for the shield element to be at a sufficiently large spacing from the field space for screening said device against the action of undesired magnetic fields.

6. In a process for erasing signals recorded on a magnetic record carrier by exposing said magnetic record carrier to a high frequency demagnetizing alternating magnetic field generated by approximately located coil having a core of magnetic material, the improvement consisting of shielding substantially the entire space filled by the demagnetizing alternating field from the unidirectional magnetic field of the earth by the use of shielding means consisting of ferromagnetic material, said shielding means arranged at sufficient distance from the said alternating magnetic field, so that magnetic saturation of the said shielding means is avoided.

7. A process as defined in claim 6 wherein the shielding is accomplished by the use of shielding means consisting of mumetal.

8. In a process for erasing signals recorded on a magnetic record carrier by the use of an erasing head having a gap, said erasing head generating a high frequency alternating magnetic field which is present in the gap zone of the gap of said erasing head comprising passing said magnetic record carrier through said gap zone of the erasing head, in which step said magnetic record carrier is in close contact with the gap of the erasing head, the improvement consisting of shielding the erasing head and the gap zone of the said erasing head during the erasing step from the unidirectional field of the earth by the use of shielding means of ferromagnetic material, the shield element being sufficiently distant from the alternating demagnetizing field of the erasing head, to avoid magnetic saturation of the shield element.

9. A process as defined in claim 8 wherein the shielding is accomplished by the use of shielding means consisting of mumetal.

References Cited by the Examiner

UNITED STATES PATENTS

| | | | |
|---|---|---|---|
| 2,229,326 | 1/1941 | Heller | 179—100.2 |
| 2,460,684 | 2/1949 | Farrow | 317—157.5 |
| 2,481,392 | 9/1949 | Camras | 179—100.2 |
| 2,563,850 | 8/1951 | Lindsay | 179—100.2 |
| 2,848,660 | 8/1958 | Boyers | 179—100.2 |
| 2,898,408 | 8/1959 | Folse | 179—100.2 |
| 3,023,280 | 2/1962 | Tronslin | 179—100.2 |

FOREIGN PATENTS

| | | |
|---|---|---|
| 972,166 | 5/1959 | Germany. |
| 794,974 | 5/1958 | Great Britain. |

OTHER REFERENCES

Begun: Magnetic Recording, Murray Hill Books, Inc., N.Y., p. 107, 1949, TK 5981, B33.

BERNARD KONICK, *Primary Examiner.*

NEWTON N. LOVEWELL, D. G. REDINBAUGH, P. F. ROTH, J. W. MOFFITT, *Assistant Examiners.*